United States Patent [19]

Coltrinari

[11] 4,029,741

[45] June 14, 1977

[54] RECOVERY OF ANTIMONY SULFIDES

[75] Inventor: Enzo L. Coltrinari, Arvada, Colo.

[73] Assignee: Tajima Roofing Co., Ltd., Tokyo, Japan

[22] Filed: Mar. 1, 1976

[21] Appl. No.: 662,597

[52] U.S. Cl. .............................. 423/179; 423/87; 423/561 R

[51] Int. Cl.² ...................................... C01B 29/00

[58] Field of Search ................. 423/87, 617, 561 R, 423/179, 202

[56] References Cited

UNITED STATES PATENTS 2,348,360  5/1944  Reed .................................... 423/87

3,911,078  10/1975  Nadkarni et al. ..................... 423/87

Primary Examiner—O. R. Vertiz
Assistant Examiner—Wayne A. Langel
Attorney, Agent, or Firm—Woodhams, Blanchard and Flynn

[57] ABSTRACT

A process is disclosed for separating antimony sulfides from solutions comprising antimony sulfides and arsenic sulfides by subjecting the solution to partial oxidation within prescribed pH limits in order to oxidize and precipitate a substantial portion of the antimony sulfides while leaving substantially all of the arsenic sulfides in solution.

9 Claims, 1 Drawing Figure

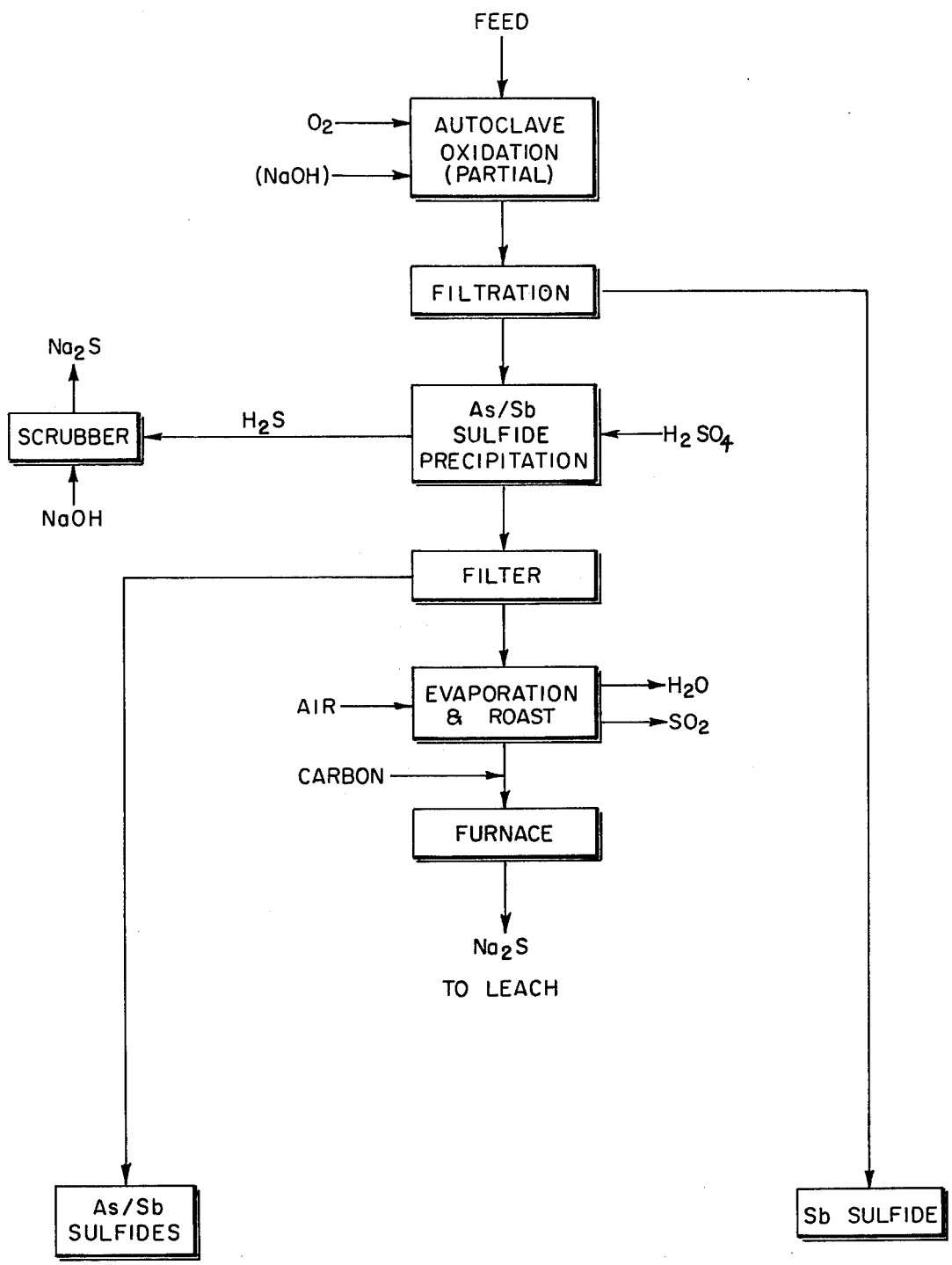

RECOVERY OF ANTIMONY SULFIDES

BACKGROUND OF THE INVENTION

1. Field of the Invention

This invention relates generally to the treating of solutions to obtain antimony values, and more particularly to recovering these antimony values as antimony sulfides.

The Prior Art

Numerous ore bodies exist which possess considerable amounts of arsenic and antimony, and various processes have been developed to recover these values. These processes are primarily dependent upon the primary recovery mechanisms employed for recovering the more abundant mineral values in the ore bodies. U.S. Pat. No. 2,348,360 to Reed discloses a method of recovering minerals from ores comprising copper, bismuth, tin, mercury, antimony, arsenic, and others by leaching the ore and solublizing the various metal sulfide components, and then sequentially oxidizing the various metal sulfides by means of air and sulfur dioxide. The metal sulfides are then recovered by means of precipitation and flotation.

U.S. Pat. No. 1,528,004 to Bassett describes a process for recovering arsenic from complex arsenic sulfides by roasting the ore in the presence of sufficient air in order to oxidize the arsenic to arsenus oxide while minimizing any oxidation of the sulfur.

No process is known which is capable of highly selective recovery of antimony sulfides from solutions which comprise antimony sulfides and arsenic sulfides. The process of the present invention effects such a separation, and thereby produces a valuable product from what is generally considered to be a waste product stream.

UTILITY OF THE INVENTION

The process of the present invention separates and produces relatively pure antimony sulfides from the hereinafter set forth starting materials, and these antimony sulfides can then be conventionally converted to antimony oxides, a basic raw material for many products.

SUMMARY OF THE INVENTION

A process is disclosed for recovering antimony sulfides from aqueous solutions comprising thioantimony compounds and thioarsenic compounds by subjecting the solution to selective oxidation by reacting the thioantimony compounds with sufficient oxygen so as to maintain a final solution e.m.f. and pH within prescribed limits in order to oxidize and precipitate a substantial portion of the thioantimony compounds as antimony sulfides while leaving substantially all of the thioarsenic compounds in solution.

BRIEF DESCRIPTION OF THE DRAWING

The FIGURE illustrates a simple process flow diagram for the separation of antimony sulfide from antimony-arsenic sulfide solutions, along with the regeneration of sodium sulfide.

DESCRIPTION OF THE PREFERRED EMBODIMENTS

The process of the present invention is primarily concerned with the oxidation of thioantimonate compounds in solution in order to selectively precipitate these values as antimony sulfides, thereby separating these antimony values from the arsenic values in solution. The thioantimonate compounds are reacted with oxygen in order to produce insoluble antimony sulfides and under some circumstances possibly minor amounts of sodium hydroxyantimonate and sulfur, along with soluble arsenic compounds, soluble sodium thiosulfate and possibly some other non-sulfate sodium salts. Hence, the primary reaction is believed to be:

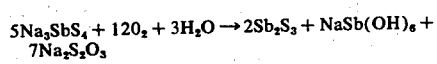

While these products are representative of the types known to be formed, the only product of primary importance is antimony sulfide. The arsenic values remain in solution, permitting the antimony sulfides to be recovered by filtering or other conventional separation techniques.

The starting solutions suitable for adaptation to the process of the invention comprise thioantimonates and thioarsenates. These values may exist in a more reduced form, such as thioantimonites and thioarsenites, and under these circumstances the solution is preferably treated with elemental sulfur in order to convert them to the thioantimonate and thioarsenate forms, respectively. The forms of the salts are not particularly important, and include, for example, sodium, potassium, ammonium, and other similar cations. For the purposes of the discussion hereinafter presented, the sodium form will be described.

Other components may also be present in the solution, and while their presence will be reflected in the final products, the antimony/arsenic separation may still be accomplished. The solution is preferably an aqueous solution.

Such a solution may be derived from a number of sources, including from leached solutions of various hydrometallurgical processes designed to produce such primary metals as copper and nickel. Antimony and arsenic often exist in minor amounts in various ore bodies, and hence when such primary values are removed from the solution, the process of the present invention may be employed to separate the antimony from the arsenic remaining in the solutions. Also, antimony may be the primary element to be recovered from various ore bodies, and the process of the present invention may be employed in the course of this recovery. The concentration of the starting materials is not particularly important to effect the desired separation, although the process may be conducted more efficiently if the thioantimonate concentration in the starting solution is from about 20 to about 80 grams per liter, and preferably from about 40 to about 60 grams per liter. Also the concentration of thioarsenate is not important as the purity of the final antimony sulfide product may be controlled by recycling this product stream back to the oxidation step until the desired purity is attained. In order to obtain a final antimony sulfide product possessing less than about 0.4% arsenic and recovering 95% of the antimony in solution, the ratio of the antimonate concentration to the arsenate concentration should be maintained at at least about two to one.

The amount of oxygen consumed during the reaction is critical to the antimony-arsenic separation. If insufficient oxygen is provided, the antimony recovery will be adversely affected. If too much oxygen is provided, all or part of the arsenic will also be oxidized, and the antimony-arsenic separation will not be accomplished. The preferred amount of oxygen consumed by the reaction when the reactants are thioantimonate and thioarsenate and there are no additional compounds competing for the oxygen is such that the final solution e.m.f. is preferably from about 300 to about 500, more preferably from about 350 to about 430, and most preferably from about 390 to about 410 millivolts, measured with Platinum/saturated Calomel electrodes. Based on this criteria, it is generally found that the amount of oxygen consumed per pound of antimony being treated is preferably from about 0.5 to about 1.5, more preferably from about 0.6 to about 0.9, and most preferably from about 0.75 to about 0.85 pounds.

It is also critical to the effective operation of the process that the pH be maintained within a range of about 7 to about 11, more preferably from about 7.5 to about 10, and most preferably from about 8 to 9. If the pH is permitted to fall below the minimum values, precipitates other than antimony sulfides tend to be produced, detrimentally affecting the product purity. The solution pH may be maintained by adding, if necessary, any suitable base, such as sodium hydroxide.

The temperature and pressure of the reaction are not particularly important from the final product standpoint, but do affect the rate of reaction. The reaction does proceed at room temperature and atmospheric pressure, although the rate is quite slow. Therefore, the reaction temperature is preferably maintained from about 25° C to about 200° C, more preferably from about 50° C to about 150° C, and most preferably from about 90° C to about 120° C. The reaction pressure is preferably maintained at at least about atmospheric pressure, more preferably from about 20 to about 150, and most preferably from about 40 to about 80 psig.

The reaction time is very fast, and within the preferred temperature and pressure parameters set forth above, the reaction time is not a factor. Hence, the process may conveniently be conducted in either a batch or continuous fashion. It is generally preferred to agitate the solution during the reaction in order to keep the oxygen well dispersed.

As was previously mentioned, the antimony product stream may be redissolved and recycled in order to obtain an antimony sulfide product practically entirely free of arsenic impurity.

Upon completion of the reaction, the prooduct stream is filtered in order to separate the antimony sulfide precipitate froom the product solution. The antimony sulfide product is then of commercial value and may be sold at this point, or futher conventionally treated to produce antimony oxide, elemental antimony, and other products. The product solution may be further treated for the production of any other values desired.

Sodium sulfide may be regenerated in conventional fashion. One preferred technique is in accordance with the scheme set forth in the FIGURE wherein the product solution is treated with sulfuric acid to precipitate the remainder of the arsenic and antimony sulfides and produce hydrogen sulfide off-gas. The remaining acidified solution is then evaporated to remove the water and the remaining sodium salts are roasted in the presence of air to produce sodium sulfate. This solium sulfate is then reduced with a carbonaceous material in a furnace to convert the sodium sulfate to sodium sulfide. The sodium sulfide may then be recirculated.

EXAMPLES

EXAMPLE 1

An aqueous solution comprising sodium thioantimonate and sodium thioarsenate, having an antimony concentration of about 49 grams per liter and an arsenic concentration of 2.66 grams per liter (an antimony/arsenic ration of about 18:1), was charged to an autoclave equipped with a turbine mixing device. Reaction temperature was maintained at 110° C and the reaction pressure was maintained at 45 psig. Oxygen was charged to the autoclave and permitted to be consumed at a rate of 0.57 pounds of oxygen per pound of antimony precipitated. The resultant pH of the product solution was 10.4. The final product analysis indicated that 92% of the antimony was precipitated, while only 2% of the arsenic was precipitated.

EXAMPLE 2

The procedure of example number 1 was repeated with an initial solution concentration of 40 grams per liter antimony and 14.8 grams per liter arsenic, providing an antimony/arsenic ration of 2.7/1. The reaction temperature was maintained at 100° C, the pressure at 70 psig, and the resultant product pH was 9.5. 0.79 pounds of oxygen was permitted to be consumed per pound of antimony precipitated. The precipitate analyzed 65% antimony, 0.17% arsenic, 25% total sulfur and 1% sodium. 60% of the initial antimony was precipitated and 0.4% of the arsenic was precipitated.

EXAMPLE 3

Again the procedure of example 1 was repeated with an initial solution concentration of 37 grams per liter antimony and 14.9 grams per liter arsenic, providing an initial antimony/arsenic ratio of 2.5:1. The reaction pressure was maintained at 70 psig, the temperature at 115° C, and the resultant product pH was about 9.3. 0.73 pounds of oxygen were permitted to be consumed per pound of antimony precipitated. 82% of the initial solution antimony was precipitated, while 0.6% of the arsenic was precipitated. The final precipitate analyzed 64% antimony, 0.18% arsenic, 27% total sulfur and 0.8% sodium.

EXAMPLE 4

The procedure of example 1 was again repeated with an initial solution concentration of 76 antimony and 1.3 grams per liter arsenic, these values existing as sodium thioantimonate and sodium thioarsenate, respectively. The reaction conditions were 112° C, 75 psig, and the resultant product pH was 9.8. 0.58 pounds of oxygen were consumed per pound of antimony precipitated. 94% of the initial antimony was precipitated and 5% of the initial arsenic was precipitated. The final precipitate analysis was 63% antimony, 0.05% arsenic, 23% total sulfur, and 3.6% sodium.

EXAMPLE 5

Again, the procedure of example 1 was followed, with an initial solution concentration of 75 grams per liter antimony and 1.3 grams per liter arsenic, providing an antimony/arsenicratio of 58:1. The temperature was maintained at 115° C, the pressure at 75 psig, and the resultant product pH was 7.6. 0.63 pounds of oxygen were consumed per pound of antimony precipitated. 99% of the initial antimony in solution was precipitated while 27% of the initial arsenic was precipitated. The final product precipitate analyzed 66% antimony, 0.31% arsenic, 23% total sulfur and 2.5% sodium.

EXAMPLE 6

An aqueous solution comprising sodium thioantimonate and sodium thioarsenate having an antimony concentration of about 46 grams per liter and an arsenic concentration of about 16 grams per liter was continuously charged to 3 autoclave vessels connected in series, each of the vessels having a 3 liter capacity, at a flow rate of 5.1 liters per hour. The reaction temperature was maintained between about 110° and 115° C and the reaction total pressure was maintained at 60 psig. Oxygen was charged to the system at a rate of 0.81 pounds of oxygen per pound of antimony precipitated, resulting in a final solution e.m.f. of about 390 millivolts measured with platinum/saturated Calomel electrodes. The pH of the product solution was maintained at 9.0. 99.1% of the antimony in the system was precipitated, and the precipitate analysis indicated that only 0.33% arsenic was present in the product precipitate.

EXAMPLE 7

An aqueous solution comprising sodium thioantimonate and sodium thioarsenate having an antimony concentration of about 46 grams per liter and an arsenic concentration of about 16 grams per liter was continuously charged to 3 autoclave vessels connected in series, each of the vessels having a 3 liter capacity, at a flow rate of about 5.1 liters per hour. The reaction temperature was maintained between about 110° and 115° C and the reaction total pressure was maintained at 60 psig. Oxygen was charged to the system at varying rates, resulting in final solution e.m.f. values measured with platinum/saturated Calomel electrodes as given in the table below. For each of the given e.m.f. values, the product solution pH is set forth, along with the concentration of antimony in the product solution, the percentage of antimony in the product solution based upon the total amount of antimony in the feed solution, and the amount of antimony and arsenic in the product precipitate, given as a percentage of the total weight of the precipitate:

| Slurry e.m.f. (millivolts) | Slurry pH | [Sb] in Prod. Soln. (g./l.) | % of Total Sb Left In Soln. | Prod. Prec. Assay % | |
|---|---|---|---|---|---|
| | | | | Sb | As |
| 350 | 8.8 | 0.13 | 0.3 | 67 | 0.41 |
| 372 | 8.8 | 0.12 | 0.3 | 66 | 0.32 |
| 392 | 9.0 | 0.42 | 0.9 | 66 | 0.29 |
| 428 | 9.2 | 2.15 | 4.7 | 65 | 0.17 |
| 419 | 9.3 | 1.51 | 3.3 | 65 | 0.12 |
| 428 | 9.2 | 3.68 | 8.0 | 67 | 0.091 |

What is claimed is:

1. A process for recovering antimony sulfides from an aqueous solution comprising thioantimony compounds and thioarsenic compounds, comprising:
   subjecting the solution to partial oxidation by injecting sufficient oxygen so as to maintain a final solution e.m.f. of from about 300 millivolts to about 500 millivolts, measured with platinum/saturated Calomel electrodes, while maintaining the product solution at a pH of from about 7 to about 11 in order to oxidize and precipitate a substantial portion of the thioantimony compounds as antimony sulfides while leaving substantially all of the thioarsenic compounds in solution.

2. The process of claim 1 wherein the thioantimony compound is thioantimonate.

3. The process of claim 2 wherein the thioantimonate compound is sodium thioantimonate.

4. The process of claim 1 wherein the thioarsenic compound is thioarsenate.

5. The process of claim 4 wherein the thioarsenate compound is sodium thioarsenate.

6. The process of claim 1 wherein the pH of the product solution is maintained from about 8 to about 9.

7. The process of claim 1 wherein the reaction temperature is maintained from about 50° C to about 150° C.

8. A process for recovering antimony sulfides from an aqueous solution comprising sodium thioantimonate and sodium thioarsenate, comprising:
   subjecting the solution to partial oxidation by reacting sufficient oxygen so as to maintain a final solution e.m.f. of from about 300 millivolts to about 500 millivolts, measured with platinum/saturated Calomel electrodes, while maintaining the product solution at a pH of from about 7 to about 11 in order to oxidize and precipitate a substantial portion of the sodium thioantimonate as antimony sulfides while leaving substantially all of the sodium thioarsenate in solution.

9. The process of claim 8 wherein the product solution is treated for the recovery of sodium sulfide.

* * * * *

UNITED STATES PATENT OFFICE
CERTIFICATE OF CORRECTION

Patent No. 4,029,741　　　　　　　　Dated June 14, 1977

Inventor(s) Enzo L. Coltrinari

It is certified that error appears in the above-identified patent and that said Letters Patent are hereby corrected as shown below:

On the first page, in item "[73]", the correct assignee is Equity Mining Corporation, Vancouver, British Columbia, Canada.

Signed and Sealed this

Twenty-second Day of November 1977

[SEAL]

Attest:

RUTH C. MASON　　　　　　　　LUTRELLE F. PARKER
Attesting Officer　　　　Acting Commissioner of Patents and Trademarks